United States Patent
Hopp

(10) Patent No.: US 8,352,133 B2
(45) Date of Patent: Jan. 8, 2013

(54) UPSHIFT DELAY FOR FUEL CUT ACQUISITION

(75) Inventor: Chris Hopp, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 975 days.

(21) Appl. No.: 12/200,175

(22) Filed: Aug. 28, 2008

(65) Prior Publication Data

US 2010/0057310 A1   Mar. 4, 2010

(51) Int. Cl.
*B60W 10/00* (2006.01)
*F16H 61/00* (2006.01)
*F16H 61/16* (2006.01)
*G06F 17/00* (2006.01)

(52) U.S. Cl. ............... 701/51; 701/55; 701/70; 477/70; 477/118

(58) Field of Classification Search ............ 701/36, 701/48, 51, 54–56, 58, 64, 67, 70, 93; 477/65, 477/78, 107, 118, 125, 905, 115
See application file for complete search history.

(56) References Cited

U.S. PATENT DOCUMENTS

| | | | |
|---|---|---|---|
| 5,651,752 | A | 7/1997 | Wakahara et al. |
| 6,527,672 | B1 | 3/2003 | Henneken et al. |
| 6,773,372 | B2 | 8/2004 | Matsubara et al. |
| 6,860,833 | B2 | 3/2005 | Ayabe |
| 6,898,506 | B2 | 5/2005 | Kawai et al. |
| 6,908,413 | B2 | 6/2005 | Ayabe et al. |
| 7,096,663 | B2 | 8/2006 | Mitsutani |
| 7,147,588 | B2 | 12/2006 | Yu |

FOREIGN PATENT DOCUMENTS

JP   2002-048224   2/2002

*Primary Examiner* — Thomas Tarcza
*Assistant Examiner* — Edward Pipala
(74) *Attorney, Agent, or Firm* — Plumsea Law Group, LLC; Mark E. Duell

(57) ABSTRACT

A system and method for upshift delay for fuel cut acquisition is disclosed. Decel lockup control may be activated if a lift foot upshift is prevented after sudden pedal release. Fuel economy may be increased by cutting fuel to the engine when decel lockup control is engaged. When the throttle is reapplied, the regular shift map resumes control and performs an upshift if necessary.

20 Claims, 7 Drawing Sheets

UPSHIFT DELAY FOR FUEL CUT ACQUISITION

BACKGROUND

1. Field of the Invention

The present invention relates to motor vehicles and in particular to a motor vehicle with a transmission configured with an upshift delay.

2. Description of Related Art

Motor vehicles with upshift management systems have been previously disclosed. Henneken et al. (U.S. Pat. No. 6,527,672) is directed to a method for controlling an electronically controlled automatic transmission. Henneken teaches an upshift prevention system that is activated during spontaneous gas/pedal release (FastOff). Henneken teaches this method in order to provide the "greatest possible spontaneity" for subsequent acceleration. Henneken teaches a system where upshift is delayed so should the driver press down in the pedal immediately following the gas/pedal release, the instantaneous available power is greater than would be available if an upshift had occurred.

In the Henneken design, the upshift prevention system is activated when a pedal position gradient is greater than a predetermined gradient threshold. The system uses the predetermined gradient threshold to determine if the pedal is released suddenly. Henneken teaches a system where upshift control only occurs after a time delay so that upshift is delayed rather than prevented. In the Henneken design, if a traction operation is detected, the upshift prevention system is deactivated.

Takizawa et al. (Japanese patent number 2002/048224) is directed to a variable-speed control device for a continuously variable transmission. According to the disclosure, the Takizawa design is intended to prevent fuel recovery of an engine that is kept in a lockup state when the transmission ratio increases at the time of a foot detach upshift. Takizawa teaches a control device that adjusts the transmission to prevent the engine speed from falling below a fuel recovery speed, which is the speed at which fuel is reintroduced in order to prevent engine stall.

There is a need in the art for a system and method that addresses the shortcomings of the prior art discussed above.

SUMMARY

A system and method for upshift delay for fuel cut acquisition is disclosed. Generally, these methods can be used in connection with an engine of a motor vehicle. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy, for example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a method for operating a motor vehicle, comprising the steps of: receiving information related to a current throttle position associated with a throttle and a current transmission mode associated with a transmission; determining a new transmission mode according to a shift map; comparing the current transmission mode with the new transmission mode; activating an upshift delay when the current throttle position is closed; and maintaining the current transmission mode indefinitely.

In another aspect, the upshift delay is deactivated when the current throttle position is open.

In another aspect, a lockup clutch associated with a torque converter is used.

In another aspect, a fuel cut is activated.

In another aspect, information related to a current vehicle speed is received.

In another aspect, the upshift delay is prevented when the current vehicle speed is above a predetermined vehicle speed.

In another aspect, the upshift delay is prevented when the transmission has already begun shifting from the current transmission mode to the new transmission mode.

In another aspect, the invention provides a method of controlling a motor vehicle, comprising the steps of: providing fuel to an engine using a set of fuel injectors; detecting an accelerated state of the motor vehicle and receiving information related to a current throttle position; activating an upshift delay associated with a transmission mode of the motor vehicle when a sudden pedal release is detected; and preventing fuel from entering the engine during the upshift delay.

In another aspect, the upshift delay is maintained indefinitely.

In another aspect, the upshift delay is deactivated when the current throttle position is open.

In another aspect, fuel is returned to the engine following deactivation of the upshift delay.

In another aspect, a lockup clutch associated with a torque converter is engaged when the upshift delay is activated.

In another aspect, the invention provides a method of controlling a motor vehicle, comprising the steps of: receiving information from one or more sensors; activating an upshift delay when a sudden pedal release is detected according to a current throttle position; engaging a lockup clutch associated with a torque converter when the upshift delay is activated; and using the lockup clutch to drive the engine using momentum of the motor vehicle.

In another aspect, fuel is prevented from entering an engine of the motor vehicle when the lockup clutch is engaged.

In another aspect, the upshift delay is maintained indefinitely.

In another aspect, the upshift delay is maintained when the current throttle position is closed.

In another aspect, the upshift delay is deactivated when the current throttle position is open.

In another aspect, fuel is returned to the engine when the upshift delay is deactivated.

In another aspect, fuel is allowed to enter the engine when the lockup clutch is not engaged.

In another aspect, the motor vehicle includes a sensor configured to monitor a current throttle position and a sensor configured to monitor a current transmission mode.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
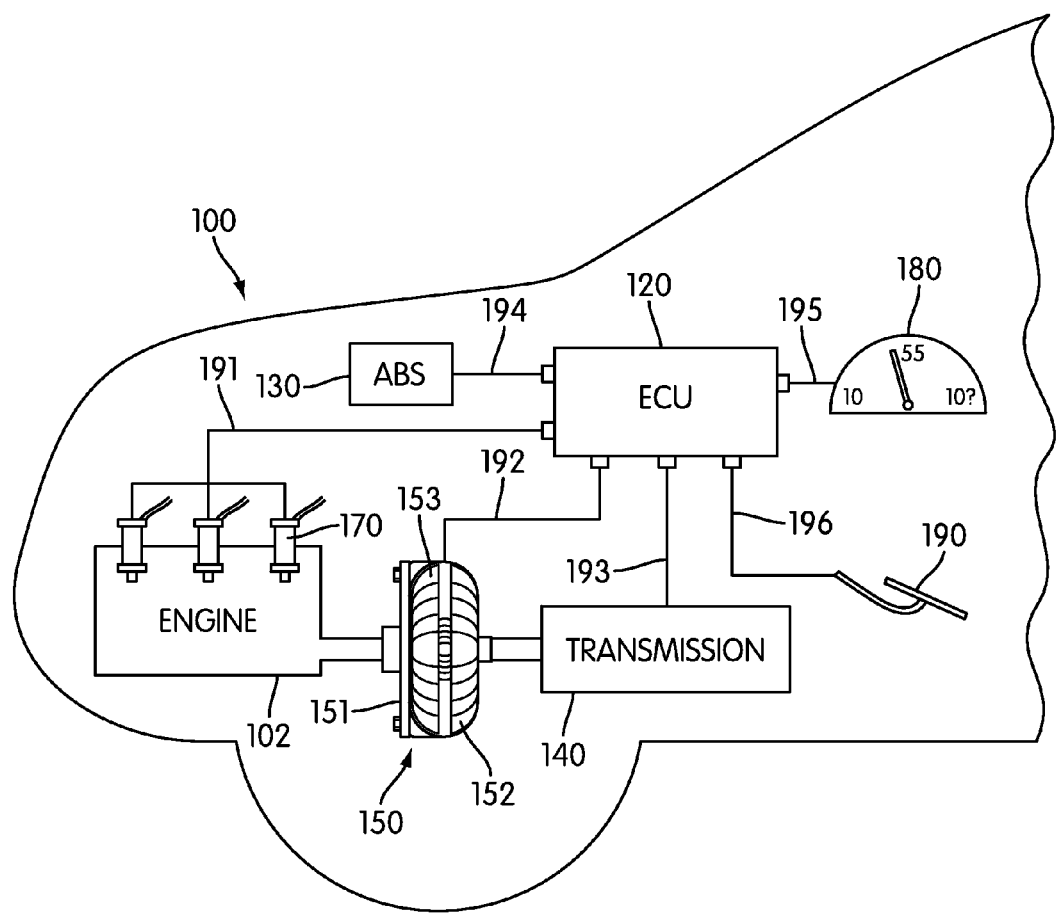
FIG. 1 is a schematic view of an exemplary embodiment of a portion of a motor vehicle.

FIG. 1 is a schematic view of an exemplary embodiment of a portion of motor vehicle 100. For purposes of illustration, motor vehicle 100 is shown as a sports utility vehicle, however it should be understood that in other embodiments motor vehicle 100 could be any type of car, truck or other kind of vehicle. In some embodiments, motor vehicle 100 could be a sedan, a compact car, a hatchback or another type of motor vehicle.

Motor vehicle 100 may include engine 102. Engine 102 may be any type of engine including any number of cylinders. In the embodiment shown in the Figures, engine 102 is a three cylinder engine. However, in other embodiments, engine 102 may have any number of cylinders, including one, two, four, six or eight or more cylinders.

Engine 102 may be associated with one or more fuel injectors that are configured to deliver fuel to engine 102. In the current embodiment engine 102 may include fuel injector set 170 that comprises three fuel injectors. In other embodiments, more or less than three fuel injectors may be associated with engine 102. Each fuel injector of fuel injector set 170 may be associated with, and configured to deliver fuel to, a cylinder within engine 102.

Motor vehicle 100 and engine 102 may be further associated with a powertrain system as well as other components necessary for a motor vehicle to operate. For clarity, only some components of motor vehicle 100 are shown in this schematic illustration. It should be understood that in other embodiments, additional components may be used as part of motor vehicle 100.

Motor vehicle 100 may include transmission 140. In an exemplary embodiment, transmission 140 is an automatic transmission. Transmission 140 may be any type of automatic transmission that is known in the art, including any type of hydraulic automatic transmission as well as manually controlled automatic transmissions. In another embodiment, transmission 140 could be a continuously variable transmission (CVT).

Motor vehicle 100 may also include torque converter 150. Torque converter 150 may be situated between engine 102 and transmission 140. Torque converter 150 may be configured to transfer rotating power between engine 102 and transmission 140 through a fluid coupling. In this embodiment, torque converter 150 comprises pump 152 and turbine 153 that are disposed within a fluid. The fluid may be a transmission fluid. Pump 152 may be associated with, and connected directly to, engine 102, while turbine 153 may be associated with, and connected directly to, transmission 140.

For clarity, only some components of torque converter 140 are shown in this schematic illustration. However, it should be understood that torque converter 150 may comprise additional components as well, including a stator, a flywheel, a turbine output shaft and a stator output shaft. Generally, any type of torque converter known in the art may be used.

Torque converter 150 may include provisions for reducing viscous losses to improve efficiency and reduce waste heat. At high speeds the fluid coupling of pump 152 and turbine 153 causes turbine 153 to move at a slightly slower speed than pump 152, which results in 'slippage'. Torque converter 150 may create a solid connection between engine 102 and transmission 140 using lockup clutch 151. With lockup clutch 151 engaged, the engine speed may be lowered while maintaining a given vehicle speed, which may increase fuel economy. This feature will be discussed in more detail later.

Engine 102 may include provisions for communicating (and in some cases controlling) the various components associated with engine 102. In the current embodiment, engine 102 may be associated with electronic control unit 120, hereby referred to as ECU 120. In some embodiments, ECU 120 may be a computer or similar device associated with a motor vehicle. ECU 120 may be configured to communicate with, and/or control, additional components of a motor vehicle not associated with engine 102.

In the current embodiment, ECU 120 may be configured to communicate with components of engine 102 associated with the powertrain. ECU 120 may communicate with fuel injector set 170 via first circuit 191. Likewise, ECU 120 may communicate with torque converter 150, transmission 140 and antilock braking system 130, hereby referred to as ABS 130, via second circuit 192, third circuit 193, and fourth circuit 194, respectively. Circuits 191-194 may comprise one or more connections. The connections could be electrical wires or wireless connections of some kind.

ECU 120 may also be configured to communicate with vehicle speed sensor 180, configured to measure a current vehicle speed, via fifth circuit 195. In particular, ECU 120 may be configured to receive information gathered by vehicle speed sensor 180 using fifth circuit 195. Fifth circuit 195 may be an electrical wire or a wireless connection of some kind.

In the current embodiment, ECU 120 may also be configured to receive information related to throttle sensor 190 (illustrated here as a gas pedal) via sixth circuit 196. In particular, ECU 120 may receive information related to the position of throttle sensor 190 that is related to the current throttle position of engine 102.

Generally, ECU 120 may be configured to communicate with additional components of engine 102 not shown in the Figures. In other embodiments, multiple electronic control units may be used. In these other embodiments, each control unit may be associated with one or more components and in communication with one another.

In some embodiments, ECU 120 is configured to monitor multiple parameters associated with engine 102 to ensure the efficient use of fuel. In particular, in some driving situations lockup clutch 151 may be engaged to reduce the viscous losses in torque converter 150 and lower the engine speed to increase fuel economy. In other driving situations, lockup clutch 151 may be used to keep engine 102 running without fuel if motor vehicle 100 is moving. The momentum of motor vehicle 100 drives the wheels and can be transmitted back to engine 102 when lockup clutch 151 is engaged. This may be referred to as 'decel lockup control'.

In previous designs using lockup clutches, decel lockup control can only be engaged under a specific set of engine operating conditions. For example, lockup clutch 151 may not be engaged during acceleration or when a transmission shift is occurring.

Figure 2:
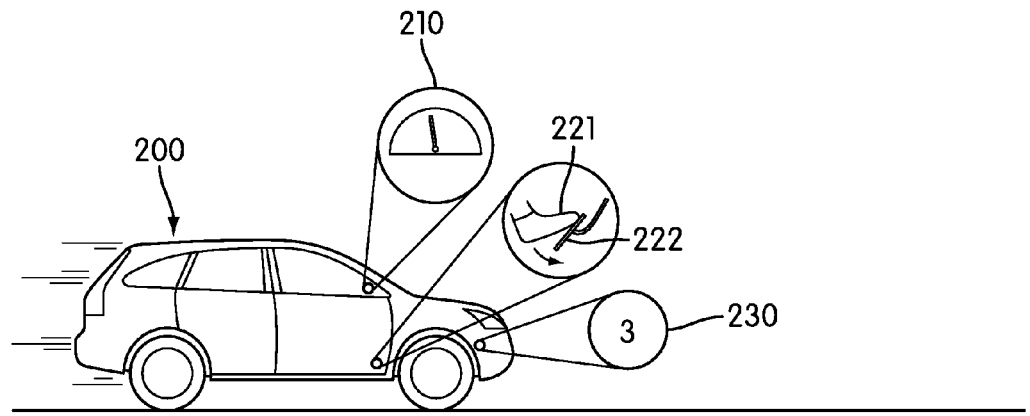
FIG. 2 is a schematic side view of an exemplary embodiment of a motor vehicle accelerating.
Figure 3:
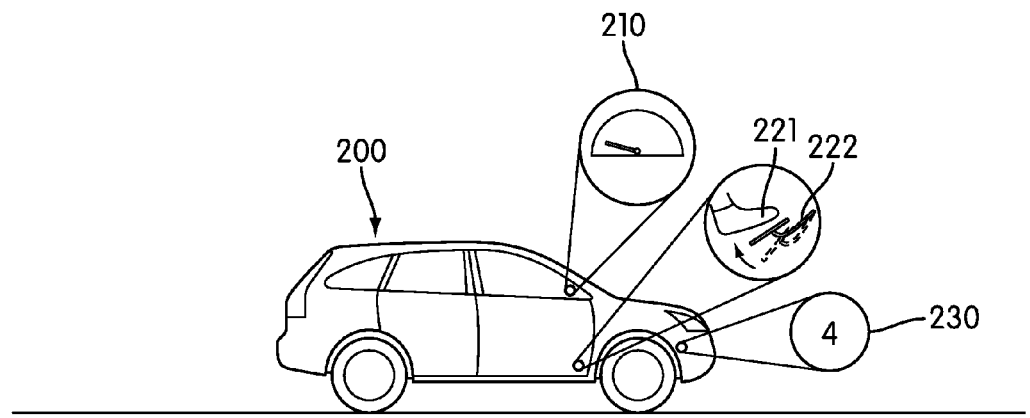
FIG. 3 is a schematic side view of an exemplary embodiment of a motor vehicle performing a lift foot upshift.

FIGS. 2-3 illustrate an exemplary embodiment of a situation where decel lockup control may not be engaged. In FIG. 2, motor vehicle 200 is accelerating. In this embodiment, driver 221 presses on throttle 222 opening the throttle valve of the engine. The current engine speed is approximately 4000 RPM, as indicated by tachometer 210. Also, transmission mode 230 is set to third gear. The term 'transmission mode', as used throughout this detailed description and in the claims, refers to a particular gear ratio of a transmission. In some embodiments, transmission modes include various 'gears' that are often associated with manual and automatic transmissions, such as first gear, second gear, third gear, fourth gear and any additional gears that are used.

Following acceleration, driver 221 releases throttle 222 as seen in FIG. 3. This quick release of throttle 222 is referred to as a 'sudden pedal release.' Often, a sudden pedal release is followed by an upshift. This upshift following a sudden pedal release is referred to as a 'lift foot upshift.' As the motor vehicle decelerates less torque is needed, which results in an upshift of the transmission. In this case, transmission mode 230 increases from third gear to fourth gear. Also, the engine speed decreases from approximately 4000 RPM to 2000 RPM, as indicated by tachometer 210. In this situation, a lift foot upshift prevents the use of decel lockup control. Because decel lockup control can not be engaged, viscous losses within torque converter 150 are higher and fuel cannot be cut to increase fuel efficiency.

Alternatively, a motor vehicle may include provisions for delaying an upshift following the sudden release of the throttle in order to allow decel lockup control to be activated. The term 'upshift delay' is used throughout this detailed description and in the claims to refer to any provisions that generally delay an upshift from occurring for an indefinite period of time. In some embodiments, an upshift delay may be activated whenever the throttle is fully closed following a sudden pedal release. In an exemplary embodiment, decel lockup control and fuel cut may also be activated immediately following a sudden pedal release.

Figure 4:
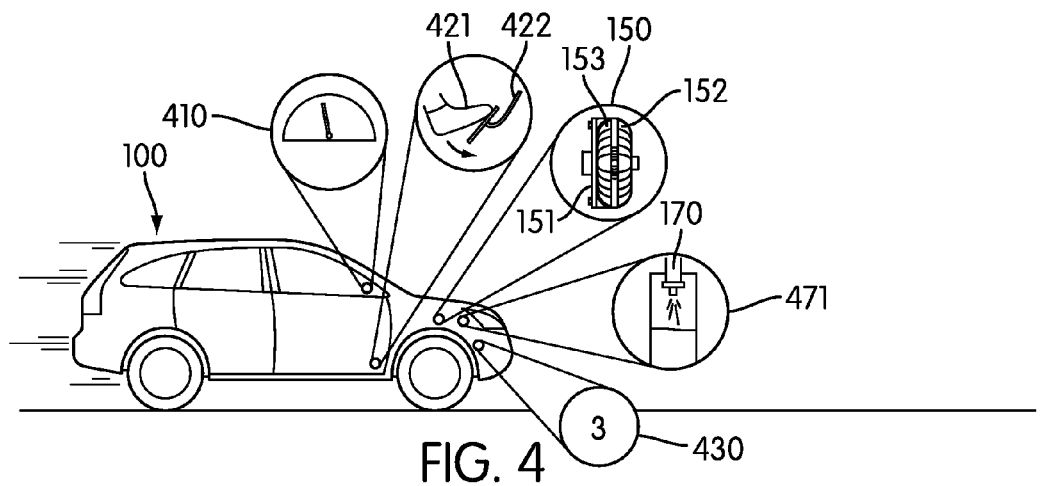
FIG. 4 is a schematic side view of an exemplary embodiment of a motor vehicle accelerating.

FIG. 4 illustrates an exemplary embodiment of motor vehicle 100 accelerating as driver 421 presses on throttle 422. As in the previous embodiment, the current engine speed is approximately 4000 RPM, as indicated by tachometer 410. Also, transmission mode 430 is set to third gear. As motor vehicle 100 accelerates, fuel injector set 170 injects fuel into cylinder 471 of engine 102. At this point, lockup clutch 151 is not engaged so there is no physical connection between pump 152 and turbine 153 in torque converter 150.

Figure 5:
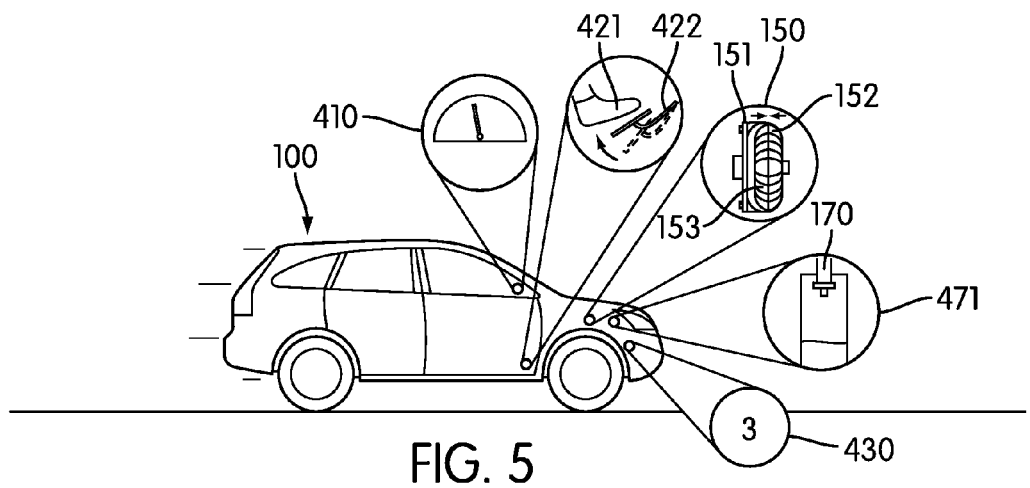
FIG. 5 is a schematic side view of an exemplary embodiment of a motor vehicle with decel lockup control activated.

FIG. 5 illustrates an exemplary embodiment of motor vehicle 100 with driver 421 releasing throttle 422. In this embodiment, a lift foot upshift is prevented. In particular, engine 102 remains at approximately 4000 RPM and transmission mode 430 remains in third gear. Decel lockup control may be applied and lockup clutch 151 is engaged, providing a physical connection between pump 152 and turbine 153. With this arrangement, rotational power is transferred from transmission 140 to engine 102 which allows the momentum of the motor vehicle to drive the wheels.

During decel lockup control, fuel injector set 170 may cut fuel to cylinder 471 of engine 102. In this situation, engine 102 does not stall since rotational power is provided through the physical connection between turbine 153 and pump 152. By avoiding lift foot upshift and initiating decel lockup control, fuel cut time is extended and fuel economy is increased.

Figure 6:
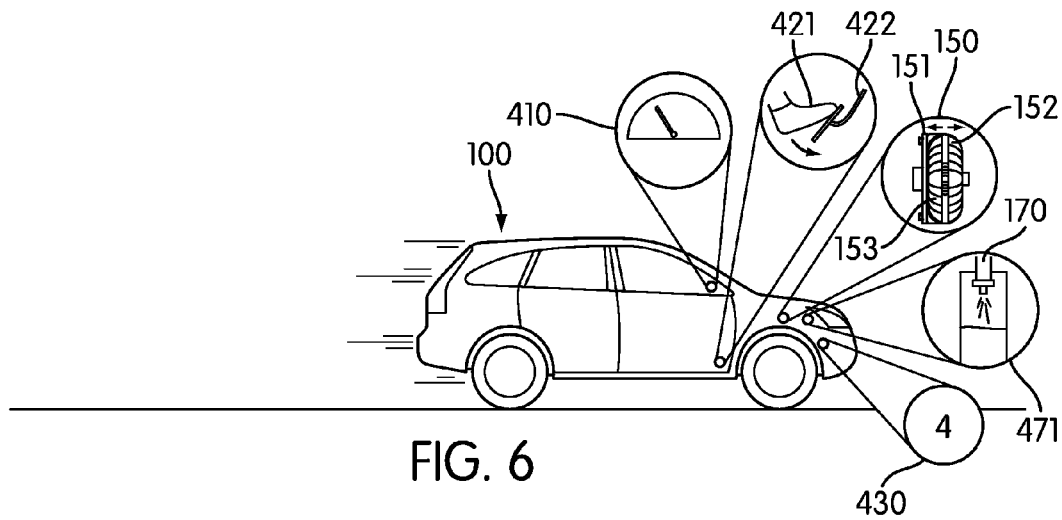
FIG. 6 is a schematic side view of an exemplary embodiment of a motor vehicle accelerating with decel lockup control deactivated.

Referring to FIG. 6, as driver 421 resumes pressing down on throttle 422, decel lockup control may be deactivated and ECU 120 continues controlling transmission 140 (see FIG. 1) according to a shift map associated with ECU 120. At this point, lockup clutch 151 may be disengaged. As decel lockup control is deactivated, fuel injection may resume, and fuel injector set 170 may inject fuel into cylinder 471. The shift map may determine an upshift is necessary and transmission mode 430 increases to fourth gear. In this embodiment, tachometer 410 indicates engine speed decreasing from 4000 RPM to approximately 2000 RPM, which may be a typical change in engine speed associated with an upshift.

By avoiding a lift foot upshift after sudden pedal release, decel lockup control may be activated. Using this arrangement, fuel economy may be increased as fuel is cut to the engine. Furthermore, the engine does not stall because rotational power is transferred from the transmission to the engine. When acceleration resumes, decel lockup control may be disengaged and the fuel injection to the engine continues.

Figure 7:
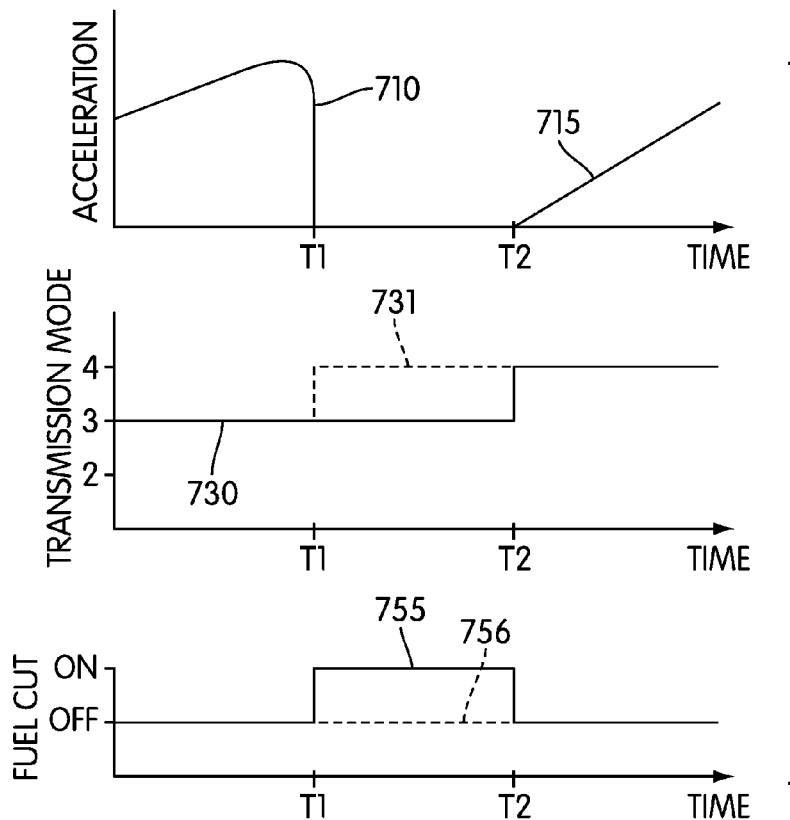
FIG. 7 is an exemplary embodiment of a relationship between acceleration, transmission mode and fuel cut with decel lockup control engaged.

FIG. 7 illustrates an exemplary embodiment of a relationship between acceleration, transmission mode and fuel cut as functions of time. It should be understood that the current embodiment is only intended to be exemplary. In other embodiments, the relationships between acceleration, transmission mode and fuel cut could be varied.

The relationships discussed here may be associated with the scenario for motor vehicle 100 discussed in FIGS. 4-6. In other words, times before time T1 may be associated with motor vehicle 100 accelerating, as in FIG. 4. Times between T1 and T2 may be associated with motor vehicle 100 decelerating slightly following a sudden pedal release, as in FIG. 5. Finally, times after T2 may be associated with motor vehicle 100 accelerating again, as the driver presses down on the throttle once again, as in FIG. 6.

In this embodiment, prior to time T1, motor vehicle 100 is accelerating, as indicated by acceleration curve 710 that is increasing. The transmission mode may be third gear, as indicated by first shift curve 730. Furthermore, fuel is being delivered to the engine, as indicated by fuel cut curve 755.

At time T1, acceleration curve 710 drops to 0, as there is a sudden pedal release and motor vehicle 100 decelerates to a constant speed. In some embodiments, an upshift is avoided at time T1, allowing decel lockup control to be engaged. In this embodiment, the transmission mode is maintained in third gear, as indicated by first shift curve 730. At this point, decel lockup control may be engaged and a fuel cut may be used, as indicated by fuel cut curve 755, which is switched to the on position between times T1 and T2. With this exemplary configuration, no fuel will be supplied to the engine between times T1 and T2.

When acceleration resumes at time T2, as the driver presses on the throttle again, an upshift occurs and the transmission mode increases to fourth gear. This configuration is indicated by first shift curve 730 for times greater than T2. At this point, the fuel cut is turned off and fuel injectors supply fuel to the cylinders. This arrangement is indicated by fuel cut curve 755 for all times greater than T2.

Using the exemplary configuration, decal lockup control and fuel cut may be used following a sudden pedal release to increase fuel efficiency for an indefinite period of time. In particular, it should be understood that the current transmission mode may be maintained as long as the throttle remains closed. In some cases, the upshift delay may last only a short period of time, on the order of a few seconds. In other cases, the upshift delay could last much longer than a few seconds.

In prior designs, during a sudden pedal release, an upshift would occur, as indicated by second shift curve 731. Because the lockup clutch cannot be activated during an upshift in these prior designs, fuel cut cannot be used, as indicated by alternative fuel cut curve 756. Therefore, using such a previous design results in an inefficient use of fuel following a sudden pedal release.

Figure 8:
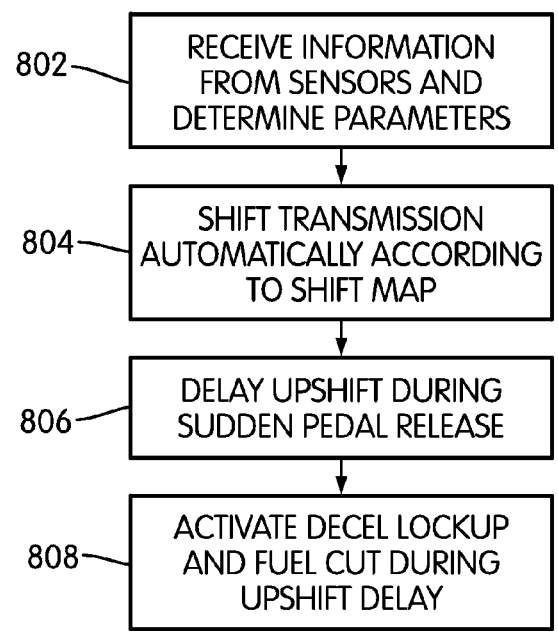
FIG. 8 is an exemplary embodiment of a process for operating an engine using upshift delay and decel lockup control.

FIG. 8 is an exemplary embodiment of a process for operating an engine using upshift delay to increase fuel efficiency. In particular, the following method includes steps for using an upshift delay simultaneously with decel lockup control and fuel cut to achieve increased fuel efficiency following a sudden pedal release. In this embodiment, the following steps are performed by ECU 120, however in some embodiments these steps may be performed by additional systems or devices associated with motor vehicle 100 and engine 102.

During first step 802, ECU 120 may receive information from one or more sensors. In an exemplary embodiment, ECU 120 may receive information from throttle sensor 190, vehicle speed sensor 180, transmission 140, torque converter 150, ABS 130 and fuel injector set 170. Also, during first step 802, ECU 120 may determine various current operating parameters according to information received from throttle sensor 190, vehicle speed sensor 180, transmission 140, torque converter 150, ABS 130 and fuel injector set 170. In particular, ECU 120 may determine a current throttle position, vehicle speed and transmission mode, according to information received from throttle sensor 190, vehicle speed sensor 180, and transmission 140, respectively. In other embodiments, ECU 120 may receive information from additional sensors.

Following first step 802, ECU 120 may proceed to second step 804. During second step 804, ECU 120 may shift transmission 140 automatically according to a shift map. The shift map may be configured to determine when the transmission mode should be changed according to various inputs including engine speed and vehicle speed. Following second step 804, ECU 120 may proceed to third step 806. During third step 806, a sudden pedal release occurs and ECU 120 may delay upshift. ECU 120 then may proceed to fourth step 808 and activates decel lockup control and fuel cut during the upshift delay. With this arrangement, fuel efficiency of motor vehicle 100 is increased.

Figure 9:
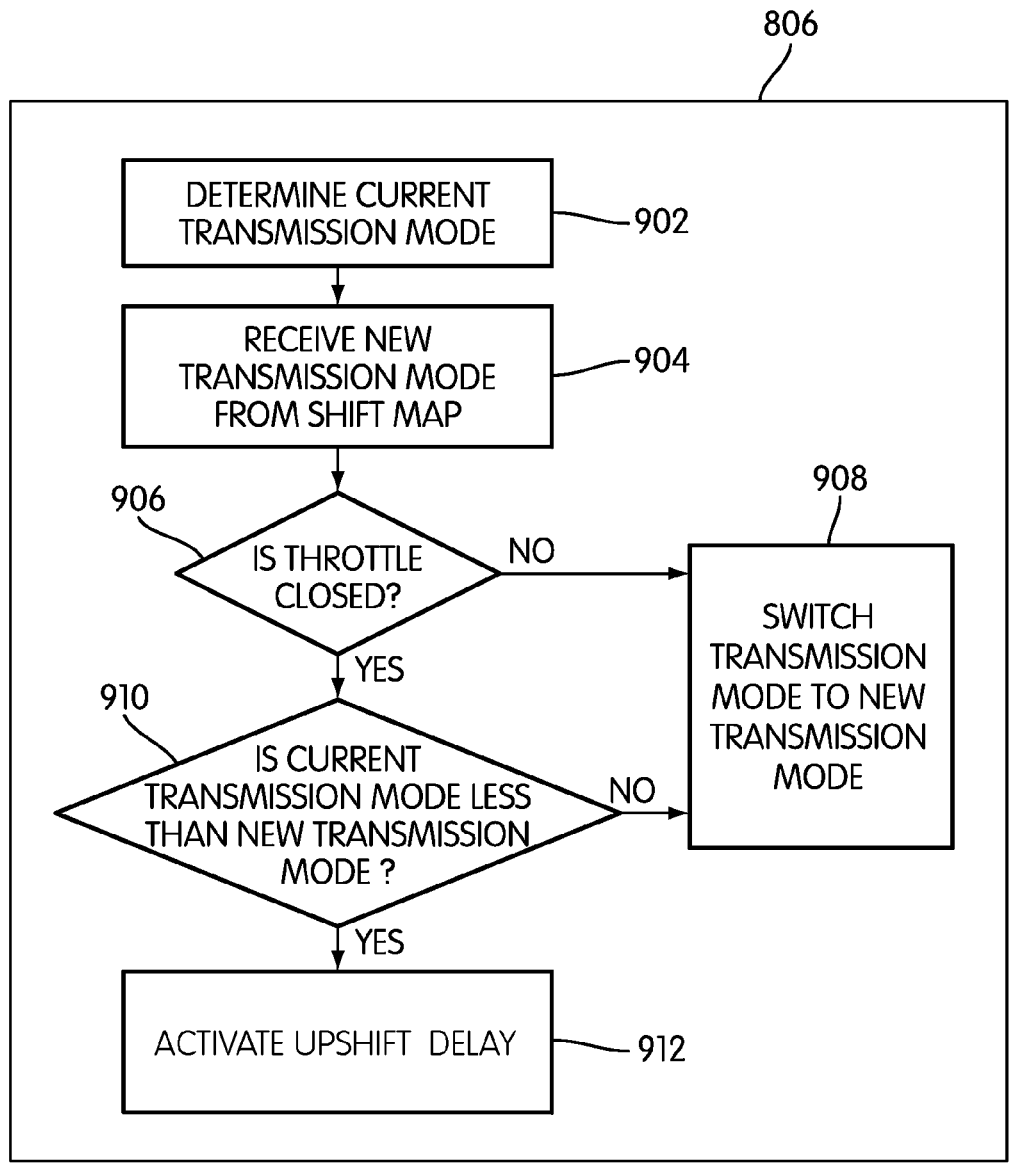
FIG. 9 is an exemplary embodiment of a process for determining if an upshift delay should be performed following sudden pedal release.

FIG. 9 is an exemplary embodiment of a detailed process associated with third step 806. In particular, these detailed steps may be used for determining if an upshift delay should be performed following sudden pedal release. The following steps may be performed by ECU 120, however in other embodiments some steps may be performed by other devices or systems associated with motor vehicle 100.

During first step 902, ECU 120 may determine the current transmission mode. In some embodiments, this may be achieved by receiving information related to the current transmission mode via third circuit 193 that is connected to transmission 140. In other embodiments, the current transmission mode may be accessed from memory or a database that may be associated with ECU 120, since ECU 120 controls the shifting of transmission 140. Following first step 902, ECU 120 may proceed to second step 904. During second step 904, ECU 120 may receive the new transmission mode from a shift map associated with ECU 120. The shift map is generally a map including various shift points as a function of input engine speed and input vehicle speed.

Following second step 904, ECU 120 may proceed to third step 906. During third step 906, ECU 120 may determine if the throttle is closed using throttle sensor 190. In some embodiments, throttle sensor 190 may detect a current throttle position. If the current throttle position is not closed, ECU 120 may proceed to fourth step 908. At this point, during fourth step 908, ECU 120 changes transmission 140 to the new transmission mode.

If, during third step 906, ECU 120 determines that the throttle is closed, ECU 120 may proceed to fifth step 910. During fifth step 910, ECU 120 may determine if the current transmission mode is less than the new transmission mode. If the current transmission mode is not less than the new transmission mode, ECU 120 may proceed to fourth step 908 and changes transmission 140 to the new transmission mode.

If, during fifth step 910, ECU 120 determines the current transmission mode is less than the new transmission mode then ECU 120 may proceed to sixth step 912. During sixth step 912, ECU 120 may activate an upshift delay. In other words, ECU 120 may maintain transmission 140 in the current transmission mode. This arrangement allows ECU 120 to activate an upshift delay after sudden pedal release.

In some embodiments it may be desirable for ECU 120 to receive additional information from vehicle speed sensor 180 and transmission 140 in order to determine if an upshift delay may be performed following sudden pedal release. In other embodiments additional information from the engine and the associated sensors or other components of the motor vehicle may be used to determine if an upshift delay may be performed.

Figure 10:
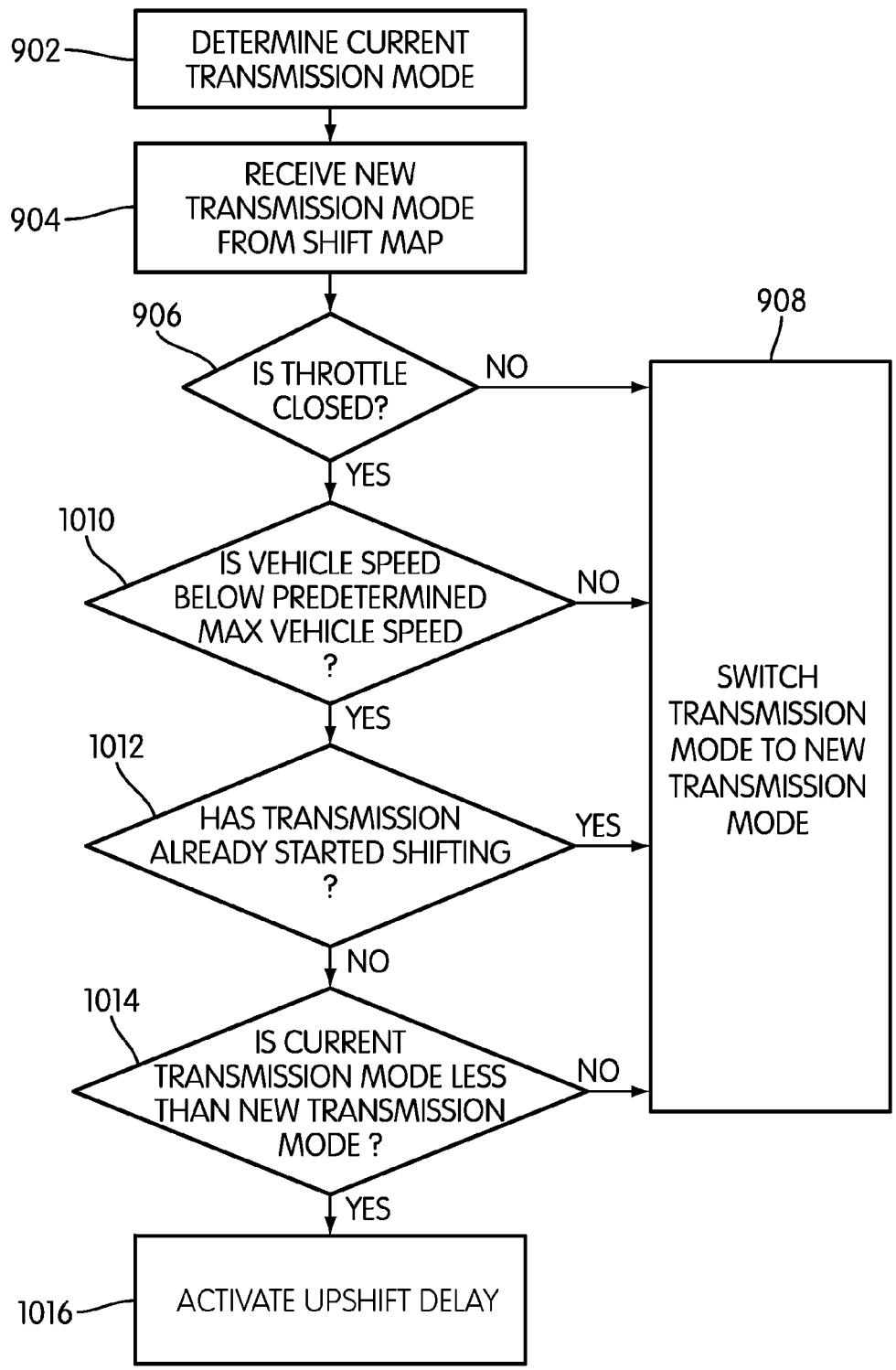
FIG. 10 is an exemplary embodiment of a process for determining if an upshift delay may be performed following sudden pedal release with information from a vehicle speed sensor and a transmission.

FIG. 10 is an exemplary embodiment of a process for determining if an upshift may be delayed after sudden pedal release using additional information received from vehicle speed sensor 180 and transmission 140. The following steps may be performed by ECU 120, however in other embodiments some steps may be performed by other devices or systems associated with motor vehicle 100.

In this embodiment, ECU 120 may proceed through steps 902, 904 and 906 as discussed in the previous embodiment in FIG. 9. During third step 906, in FIGS. 9 and 10, ECU 120 may determine if the throttle is closed using information from throttle sensor 190. If the throttle is not closed, ECU 120 may proceed to fourth step 908 and changes transmission 140 to the new transmission mode.

Referring to FIG. 10, if ECU 120 determines the throttle is closed during third step 906, ECU 120 may proceed to fifth step 1010. During fifth step 1010, ECU 120 may determine if the current vehicle speed is below the predetermined maximum vehicle speed. If the current vehicle speed is not below the predetermined maximum vehicle speed, then ECU 120 may proceed to step 908 that has been previously discussed. If the vehicle speed is below the predetermined maximum vehicle speed, ECU 120 may proceed to sixth step 1012. During sixth step 1012, ECU 120 may determine if transmission 140 has started shifting. If transmission 140 has started shifting, ECU 120 may proceed to fourth step 908 that has been previously discussed.

During sixth step 1012, if ECU 120 determines that transmission 140 has not started shifting then ECU 120 may proceed to seventh step 1014. During seventh step 1014, ECU 120 may determine if the current transmission mode is less than the new transmission mode. If the current transmission mode is not less than the new transmission mode, then ECU 120 may proceed to fourth step 908 that has been previously discussed. If ECU 120 determines the current transmission mode is less than the new transmission mode then ECU 120 may proceed to eighth step 1016. During eighth step 1016, ECU 120 may activate an upshift delay. In other words, ECU 120 maintains transmission 140 in the current transmission mode.

This arrangement allows ECU 120 to determine if an upshift delay may be activated after sudden pedal release with information received from throttle sensor 190, vehicle speed sensor 180 and transmission 140. In other embodiments, additional information may be used to determine if an upshift delay may be activated.

Figure 11:
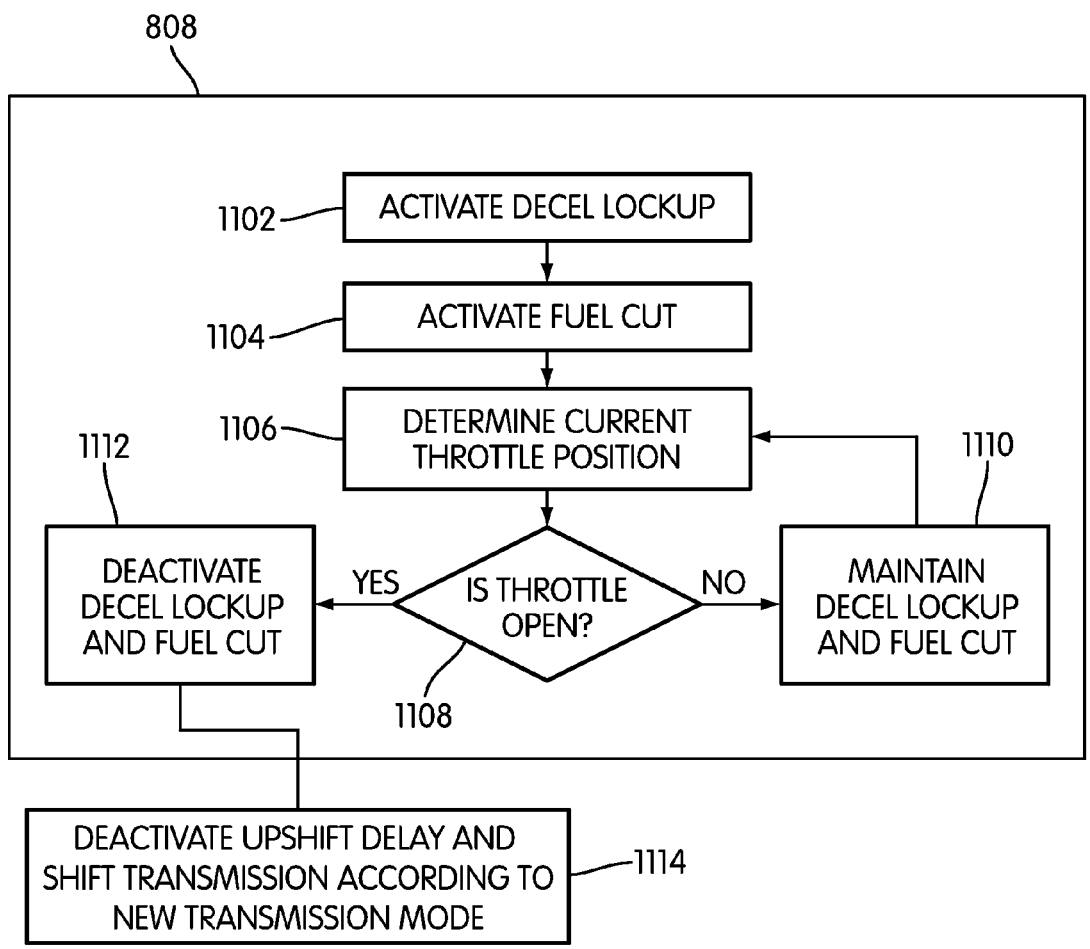
FIG. 11 is an exemplary embodiment of a process for activating and deactivating decel lockup control.

After an upshift delay is activated during a sudden pedal release, decel lockup control may be activated and a fuel cut initiated to increase fuel economy as described in the exemplary embodiment in FIG. 8. FIG. 11 is an exemplary embodiment of a detailed process for activating and deactivating decel lockup control. The following steps may be a set of sub steps that may be associated with step 808 and an additional step associated with shifting transmission 140 according to the shift map. In this embodiment, the following steps may be performed by ECU 120, however in some embodiments these steps may be performed by additional systems or devices associated with motor vehicle 100 and engine 102.

During first step 1102, ECU 120 activates decel lockup control following an upshift delay. Following first step 1102, ECU 120 may proceed to second step 1104. During second step 1104, ECU 120 may activate a fuel cut. In some embodiments, the fuel cut may be achieved by turning off fuel injectors 170. In other embodiments, the fuel cut could be achieved by a valve or other device configured to prevent fuel from reaching fuel injectors 170.

Following second step 1104, ECU 120 may proceed to third step 1106. During third step 1106, ECU 120 may determine the current throttle position by checking throttle sensor 190. Following third step 1106, ECU 120 may proceed to fourth step 1108. During fourth step 1108, ECU 120 may determine if the current throttle position is open. If the throttle is closed, ECU 120 may proceed to fifth step 1110. At fifth step 1110, ECU 120 may maintain decel lockup control and a fuel cut. After fifth step 1110, ECU 120 may proceed to third step 1106, which has been previously discussed.

At this point, ECU 120 may cycle through steps 1106, 1108 and 1110 until the current throttle position is open. In some embodiments, ECU 120 may cycle through steps 1106, 1108 and 1110 indefinitely. By maintaining fuel cut indefinitely, increased fuel efficiency can be gained for extended periods of time.

If, during fourth step 1108, ECU 120 determines the throttle is open then ECU 120 may proceed to sixth step 1112. During sixth step 1112, ECU 120 may deactivate decel lockup control and the fuel cut. Following step 1112, ECU 120 may proceed to step 1114. At this point, during step 1114, ECU 120 may determine an upshift delay is no longer necessary and may continue shifting transmission 140 according to the new transmission mode determined by the shift map.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A method for operating a motor vehicle using an electronic control unit, the electronic control unit being configured to perform the steps of:
   receiving information related to a current throttle position associated with a throttle and a current transmission mode associated with a transmission;
   determining a new transmission mode according to a shift map;
   comparing the current transmission mode with the new transmission mode;
   activating an upshift delay when the current throttle position is closed;
   maintaining the current transmission mode while the current throttle position is closed; and
   wherein the current transmission mode is maintained by the electronic control unit for as long as the current throttle position remains closed.

2. The method according to claim 1, wherein the upshift delay is deactivated by the electronic control unit when the current throttle position is open.

3. The method according to claim 1, wherein a lockup clutch associated with a torque converter is used.

4. The method according to claim 3, wherein a fuel cut is activated by the electronic control unit.

5. The method according to claim 1, wherein information related to a current vehicle speed is received at the electronic control unit.

6. The method according to claim 5, wherein the upshift delay is prevented by the electronic control unit when the current vehicle speed is above a predetermined vehicle speed.

7. The method according to claim 6, wherein the upshift delay is prevented by the electronic control unit when the transmission has already begun shifting from the current transmission mode to the new transmission mode.

8. A method of controlling a motor vehicle using an electronic control unit, comprising the steps of:
   providing fuel to an engine using a set of fuel injectors;
   detecting an accelerated state of the motor vehicle and receiving information at the electronic control unit related to a current throttle position;
   wherein the electronic control unit is configured to perform the steps of:
   activating an upshift delay associated with a transmission mode of the motor vehicle when a sudden pedal release is detected;

preventing fuel from entering the engine during the upshift delay;

maintaining the upshift delay while the current throttle position is closed; and wherein the upshift delay is maintained by the electronic control unit for as long as the current throttle position remains closed.

9. The method according to claim 8, wherein the upshift delay is prevented by the electronic control unit when a current vehicle speed is above a predetermined vehicle speed.

10. The method according to claim 8, wherein the upshift delay is deactivated by the electronic control unit when the current throttle position is open.

11. The method according to claim 10, wherein fuel is returned to the engine following deactivation of the upshift delay by the electronic control unit.

12. The method according to claim 8, wherein a lockup clutch associated with a torque converter is engaged when the upshift delay is activated by the electronic control unit.

13. A method of controlling a motor vehicle using an electronic control unit, the electronic control unit being configured to perform the steps of:

receiving information from one or more sensors;

activating an upshift delay when a sudden pedal release is detected according to a current throttle position;

engaging a lockup clutch associated with a torque converter when the upshift delay is activated;

using the lockup clutch to drive the engine using momentum of the motor vehicle;

maintaining the upshift delay while the current throttle position is closed; and wherein the upshift delay is maintained by the electronic control unit for as long as the current throttle position remains closed.

14. The method according to claim 13, wherein fuel is prevented from entering an engine of the motor vehicle when the lockup clutch is engaged.

15. The method according to claim 13, wherein the upshift delay is prevented by the electronic control unit when a current vehicle speed is above a predetermined vehicle speed.

16. The method according to claim 13, wherein the upshift delay is prevented by the electronic control unit when a transmission of the motor vehicle has already begun shifting from a current transmission mode to a new transmission mode.

17. The method according to claim 13, wherein the upshift delay is deactivated by the electronic control unit when the current throttle position is open.

18. The method according to claim 17, wherein fuel is returned to the engine when the upshift delay is deactivated.

19. The method according to claim 14, wherein fuel is allowed to enter the engine when the lockup clutch is not engaged.

20. The method according to claim 16, wherein the motor vehicle includes a sensor configured to monitor the current throttle position and a sensor configured to monitor the current transmission mode.

* * * * *